(12) United States Patent
Szydlo

(10) Patent No.: US 7,739,733 B2
(45) Date of Patent: Jun. 15, 2010

(54) STORING DIGITAL SECRETS IN A VAULT

(75) Inventor: Michael Szydlo, Allston, MA (US)

(73) Assignee: EMC Corporation, Hopkinton, MA (US)

( * ) Notice: Subject to any disclaimer, the term of this patent is extended or adjusted under 35 U.S.C. 154(b) by 1246 days.

(21) Appl. No.: 11/265,539

(22) Filed: Nov. 2, 2005

(65) Prior Publication Data

US 2007/0124321 A1    May 31, 2007

(51) Int. Cl.
*G06F 7/04*    (2006.01)

(52) U.S. Cl. .............................. 726/17; 463/29; 705/44; 713/168; 713/183; 713/186; 380/2

(58) Field of Classification Search ...................... 726/5, 726/17, 20; 380/2
See application file for complete search history.

(56) References Cited

U.S. PATENT DOCUMENTS

| | | | |
|---|---|---|---|
| 6,317,834 B1 * | 11/2001 | Gennaro et al. ............. | 713/186 |
| 6,804,786 B1 * | 10/2004 | Chamley et al. .............. | 726/20 |
| 7,051,209 B1 * | 5/2006 | Brickell ...................... | 713/183 |
| 2003/0105959 A1 * | 6/2003 | Matyas et al. ............... | 713/168 |
| 2005/0031120 A1 * | 2/2005 | Samid ......................... | 380/28 |

OTHER PUBLICATIONS

Carl Ellison; Chris Hall; Randy Milbert; Bruce Schneier | Protecting secret keys with personal entropy (http://www.schneier.com/paper-personal-entropy.pdf)| Oct. 28, 1999 | v. 16, 2000| pp. 311-318.*

Bleichenbach, D. et al., "Noisy Polynomial Interpolation and Noisy Chinese Remaindering", *In B. Preneel, editor Advances in Cryptology, Eurocrypt'00. Springer Verlag*, pp. 53-69, 2000 LNCS No. 1807.
Ford, W. et al., "Server Assisted Generation of a Strong Secret from a Password", In Proceedings of the IEEE 9th Internatinal Workshop on Enabliing Technologies, Gaithersburg, MD, Jun. 2000, NIST.
Frykholm, N. et al., "Error-Tolerant Password Recovery", *ACM Conference on Computer and Communications Security*, pp. 1-9, 2001.
Juels, A. et al., "A Fuzzy Vault Scheme", *ISIT 2002, Lausanne, Switzerland*, one page, Jun. 30-Jul. 5, 2002.
RSA PKCS #5: Password-based Cryptography Standard, pp. 1-30, Mar. 25, 1999.
Juels, A. et al. A Fuzzy Commitment Scheme. In 5th ACM Conference on Computer Communications Security, pp. 28036 Singapore Nov. 1999 ACM Press.

* cited by examiner

*Primary Examiner*—Taghi T Arani
*Assistant Examiner*—Mahfuzur Rahman
(74) *Attorney, Agent, or Firm*—BainwoodHuang

(57) ABSTRACT

Methods and systems for storing secret information in a digital vault include obtaining from a user answers to a number of different questions, and identifying which subsets or combinations of the questions for which correct answers later provided by an entity will enable that entity to gain access to the secret information in the vault. The number of questions in each combination is less than the total number of questions, and at least one subset has at least two questions. For each subset, a corresponding string of answers is generated, the string is hashed, and the resulting hash value is combined with the digital secret. This hides the digital secret, which is then stored in the vault. Methods and systems for registering authentication material include storing a hashed string of answers for each combination, generating "multiple authenticators."

46 Claims, 8 Drawing Sheets

STORING DIGITAL SECRETS IN A VAULT

TECHNICAL FIELD

This invention generally relates to digital data encryption.

BACKGROUND OF THE INVENTION

Knowledge-based authentication (KBA) refers broadly to authentication methods that rely on private user information to secure access to a user secret or access to a remote resource. Examples of such user secrets include digital signatures, encryption keys, private computing resources, and private data such as credit card numbers. A commonly employed method of KBA hides user secrets using a password or PIN, and then requires exact reproduction of that password or PIN to recover the secret. Another KBA technique asks the user to demonstrate knowledge of recent computer activity or transactions before allowing access to further transactions. A disadvantage of the above methods is the strict requirement of the user memorizing and exactly reproducing a value that may not be memorable. In cases where the user forgets the exact password, for example, the user will typically require third-party intervention to reset or recover the password. This costs time, effort, and money. Authentication technologies employing hardware such as tokens also achieve high levels of security, but usually at an even higher implementation and support cost.

A potentially more convenient and user-friendly method of KBA asks the user a series of questions to help establish identity during an "enrollment" or initialization step. The user secret is then encrypted using the answers provided to these questions. To recall the secret the same set of questions is asked, and reproduction of the correct set of answers successfully authenticates the user. The set of questions might be personal questions for which the answers are memorable, and with answers that only the user is likely to know, e. g. "What is your mother's maiden name?" or "What was the name of your first pet?" Despite its convenience, this method of KBA may be less secure than some other data encryption technologies, making its implementation risky. The secret answers may be susceptible to dictionary attack, the answers to some user questions may be found in the public record, or the answers could be available at some cost or effort on the attacker's part.

SUMMARY OF THE INVENTION

Encrypting digital secrets with knowledge-based authentication methods are appealing due to their ease of deployment and low cost; the ideas presented herein represent ways to strengthen the security of their implementation while maintaining their user-friendly features. One method of doing this employs multiple questions, so that an attacker attempting to recover a secret would have to either possess a large amount of knowledge of the user or would have to exhaustively attempt to obtain the right answer to every question through a dictionary-type attack. The correct user answers are not stored on the computer in readable form but are instead encrypted along with the digital secret in a vault that is stored on a computer.

A key feature of the implemented algorithm is that the entire set of questions does not need to be answered correctly in order to successfully decrypt the digital secret. This is useful because sometimes a legitimate user might misspell a correct answer, or might have forgotten which answer they previously provided. By allowing for some user error, this feature aids the usability of the method. A method that requires all answers to be answered exactly correctly increases the chance that a simple misspelling of an answer will prevent a legitimate user from authenticating. While the implemented algorithm allows for some mistakes on the part of the user, the total number of questions is large enough so that it would be unlikely that an attacker would be able to guess the correct answer to even a substantial portions of the questions.

In general, in one aspect the invention features a method for storing secret information in a digital vault. The method includes obtaining from a user an answer to each of m different questions to generate a set of m answers, wherein m is an integer greater than or equal to 3. The method also includes identifying subsets $S_K$ of the m questions for which acceptable answers later provided by an entity will enable that entity to gain access to the secret information in the digital vault, wherein each subset $S_K$ includes a set of $n_K$ questions, wherein K is an integer identifying the subset and each $n_K$ is an integer that is less than m, wherein at least one subset $S_K$ has at least two elements. The method includes, for each subset of questions, $S_K$, generating a string $T_K$ from the obtained answers for that subset of questions $S_K$; mathematically combining a value derived from the string, $T_K$, with the secret information to generate a result, $F_K$, that hides the secret information; and storing $F_K$. The digital vault includes all stored $F_K$.

Various embodiments include one or more of the following features. Acceptable answers can correspond to answers to the subset of questions obtained from the user. Acceptable answers can be derived from answers obtained from the user. The digital vault can be stored on a remote server. The m different questions can be stored on a remote server and downloaded to a user computer. The digital vault can be stored on a remote server. Mathematically combining a value derived from the string $T_K$ and the secret information can include using an exclusive-or function. Mathematically combining a value derived from the string $T_K$ and the secret information can include using an encryption function. The encryption function can include integrity protection. The string $T_K$ can include a concatenation of the obtained answers. The string $T_K$ can also include a random number. The string $T_K$ can also include a number specific to the vault. The digital vault can also include a description of subsets $S_K$. The method can also include erasing the obtained answers and the secret information after storing $F_K$. The method can also include erasing the intermediate values used in the computation of the vault. The subsets $S_K$ can include all possible subsets of n questions, where n is an integer less than m.

The method can also include generating a result that allows the verification of later decryption of the secret information. Mathematically combining a value derived from the string, $T_K$, with the secret information can include mathematically transforming the string, $T_K$, to generate a value $F_K'$, and mathematically combining that value, $F_K'$, with the secret information to generate a result, $F_K$, that hides the secret information. Mathematically transforming the string $T_K$ can include hashing $T_K$. Mathematically transforming the string $T_K$ can include hashing $T_K$ q times, wherein q is greater than one. Mathematically transforming the string $T_K$ can include the application of a key derivation function. Mathematically combining the value, $F_K'$, with the secret information can include using an exclusive-or function. Mathematically combining the value, $F_K'$, with the secret information can include using an encryption function. The method can also include, for each subset of questions, $S_K$, mathematically transforming the string, $T_K$, to generate a commitment value, $G_K$; and storing $G_K$ with $F_K$. In this case, the digital vault includes all stored $F_K$ and $G_K$. The method can also include generating a confirmation string Z from the secret information which allows the verification of later decryption of the secret information; and storing Z with $F_K$. In this case, the digital vault comprises Z and all stored $F_K$.

In general in another aspect, the invention features a method of gaining access to secret information contained within a digital vault. The method includes obtaining from a user an answer to each of m different questions to generate a set of m answers, wherein m is an integer greater than or equal to 3. The method also includes identifying subsets $S_K$ of the m questions for which acceptable answers provided by an entity will enable that entity to gain access to the secret information in the digital vault, wherein each subset $S_K$ includes a set of $n_K$ questions, wherein K is an integer identifying the subset and each $n_K$ is an integer that is less than m, wherein at least one subset $S_K$ has at least two elements. The method also includes selecting a first subset from among the subsets $S_K$ of questions and for the selected subset generating a string $V_K$ from the obtained answers for that subset of questions $S_K$; comparing a value derived from the string, $V_K$ to a set of stored values to find a match; and if a match is found, giving the user access to the secret information. The method also includes repeating generating a string $V_K$ from the obtained answers for that subset of questions $S_K$; comparing a value derived from the string, $V_K$ to a set of stored values to find a match; and if a match is found, giving the user access to the secret information for a next selected subset among the subsets $S_K$ until all subsets $S_K$ have been selected or until a match is found.

Various embodiments include one or more of the following features. Acceptable answers can correspond to answers to the subset of questions obtained from the user. Acceptable answers can be derived from answers obtained from the user. Giving the user access to the secret information can include using a value derived from the string $V_K$ as a decryption key for the secret information contained within the digital vault. Giving the user access to the secret information can include using a value derived from the string $V_K$ with an exclusive-or function on the secret information contained within the digital vault. Comparing a value derived from the string, $V_K$ to a set of stored values to find a match can include mathematically transforming the string, $V_K$, to generate a value $H_K$; and comparing a value derived from the value, $H_K$, to a set of stored values to find a match. Mathematically transforming the string $V_K$ can include using a one-way hash function. The method can also further include allowing the user to attempt to access at least a portion of the digital information in the vault only after the user successfully authenticates. The m different questions can be stored on a remote server and downloaded to a user computer. The digital vault can be stored on a remote server. The method can also include authenticating the user to the remote server. The method can also include authenticating the user to the remote server by sending a value derived from the string, $V_K$, to the server and comparing a value derived from the string, $V_K$, to a set of values stored at the server to find a match; and, if a match is found, sending the user at least a portion of the vault. Identifying subsets $S_K$ of the m questions can include obtaining identifying information from the digital vault.

In general, in another aspect, the invention features a method of gaining access to secret information contained within a digital vault. The method includes obtaining from a user an answer to each of m different questions to generate a set of m answers, wherein m is an integer greater than or equal to 3. The method also includes identifying subsets $S_K$ of the m questions for which acceptable answers provided by an entity will enable that entity to gain access to the secret information in the digital vault, wherein each subset $S_K$ includes a set of $n_K$ questions, wherein K is an integer identifying the subset and each $n_K$ is an integer that is less than m, wherein at least one subset $S_K$ has at least two elements. The method also includes selecting a first subset from among the subsets $S_K$ of questions and for the selected subset generating a string $V_K$ from the obtained answers for that subset of questions $S_K$; using a value derived from the string, $V_K$, to attempt to access the secret information; and verifying whether the attempt was successful. Unless the attempt was successful, repeating (a) through (c) for a next selected subset among the subsets $S_K$ until all subsets $S_K$ have been selected; and if the attempt is successful, giving the user access to the secret information.

Various embodiments include one or more of the following features. Acceptable answers can correspond to answers to the subset of questions obtained from the user. Acceptable answers can be derived from answers obtained from the user. Verifying whether the attempt is successful can include using an encryption function with integrity protection. Verifying whether the attempt is successful can include comparing a result of the attempt to access the secret information to a confirmation string stored in the digital vault. Using a value derived from the string $V_K$ to attempt to access the secret information can include using a value derived from the string $V_K$ as a decryption key for the secret information contained within the digital vault. Using a value derived from the string, $V_K$, to attempt to access the secret information can include mathematically transforming the string, $V_K$, to generate a value, $U_K'$; and using a value derived from the value, $U_K'$, to attempt to access the secret information. Mathematically transforming the string $V_K$ can include using a one-way hash function. The method can also include allowing the user to attempt to access at least a portion of the digital information in the vault only after the user successfully authenticates. The m different questions can be stored on a remote server and downloaded to a user computer. The digital vault can be stored on a remote server. The method can also include authenticating the user to the remote server. The method can also include authenticating the user to the remote server by sending a value derived from the string, $V_K$, to the server and comparing a value derived from the string, $V_K$, to a set of values stored at the server to find a match; and if a match is found, sending the user at least a portion of the vault. Identifying subsets $S_K$ of the m questions can include obtaining identifying information from the digital vault.

In general, in another aspect, the invention features a method of registering authentication material. The method includes obtaining from a user an answer to each of m different questions to generate a set of m answers, wherein m is an integer greater than or equal to 3. The method also includes identifying subsets $S_K$ of the m questions for which acceptable answers later provided by an entity will enable that entity to authenticate, wherein each subset $S_K$ includes a set of $n_K$ questions, wherein K is an integer identifying the subset and each $n_K$ is an integer that is less than m, wherein at least one subset $S_K$ has at least two elements. The method also includes, for each subset of questions, $S_K$, generating a string $T_K$ from the obtained answers for that subset of questions $S_K$; mathematically transforming the string $T_K$, to generate a value, $G_K$; and storing $G_K$. The authentication material comprises all stored $G_K$.

Various embodiments include one or more of the following features. Acceptable answers can correspond to answers to the subset of questions obtained from the user. Acceptable answers can be derived from answers obtained from the user. Storing $G_K$ can include sending $G_K$ to a remote server, and storing $G_K$ on the server. The method can also include, for each subset of questions, $S_K$, mathematically combining the string, $T_K$, with secret information to generate a result, $F_K$, that hides the secret information; and storing $F_K$. A vault includes all stored $F_K$. Storing $F_K$ can include sending $F_K$ to a remote server, and storing $F_K$ on the server. Mathematically combining the string, $T_K$, with secret information can include mathematically transforming the string, $T_K$, to generate a value $F_K'$, and mathematically combining that value, $F_K'$, with the secret information to generate a result, $F_K$, that hides the secret information.

In general in another aspect, the invention features a method of authenticating a user. The method includes obtaining from a user an answer to each of m different questions to generate a set of m answers wherein, m is an integer greater than or equal to 3. The method also includes identifying subsets $S_K$ of the m questions for which acceptable answers later provided by an entity will enable that entity to authenticate, wherein each subset $S_K$ includes a set of $n_K$ questions wherein K is an integer identifying the subset and each $n_K$ is an integer that is less than m, wherein at least one subset $S_K$ has at least two elements. The method also includes, for each subset of questions, $S_K$, generating a string $V_K$ from the obtained answers for that subset of questions $S_K$; comparing a value derived from the string $V_K$ to a set of stored values to find a match; and if a match is found, authenticating the user. The method also includes repeating generating a string $V_K$ from the obtained answers for that subset of questions $S_K$; comparing a value derived from the string $V_K$ to a set of stored values to find a match; and if a match is found, authenticating the user for a next selected subset among the subsets $S_K$ until all subsets $S_K$ have been selected or until a match is found.

Various embodiments include one or more of the following features. Acceptable answers can correspond to answers to the subset of questions obtained from the user. Acceptable answers can be derived from answers provided by the user. Comparing a value derived from the string $V_K$ to a set of stored values to find a match can include sending a value derived from the string $V_K$ to a remote server, and comparing a value derived from the string $V_K$ to a set of values stored at the server to find a match. The m different questions can be stored on a remote server and downloaded to a user computer. The string $V_K$ can include a concatenation of the obtained answers. Comparing a value derived from the string $V_K$ to a set of stored values to find a match can include mathematically transforming the string $V_K$ to generate a value $H_K$ and comparing a value derived from the value $H_K$ to a set of stored values to find a match. Mathematically transforming the string $V_K$ can include hashing $V_K$. The subsets $S_K$ can include all possible subsets of n questions, wherein n is an integer less than m. The method can also include after authenticating the user, giving the user access to secret information.

DETAILED DESCRIPTION

Overview

The embodiment described herein is a software-based encryption/decryption algorithm that is implemented on a computer system. The algorithm asks a user a set of m questions and then encrypts a user digital secret with k different combinations, or subsets, of the answers the user provides. Then the algorithm stores the encrypted data in a vault. Later the algorithm decrypts the encrypted secret when it asks the user (or an entity with sufficient knowledge of the user) the same set of questions, and the user provides a sufficient number n of correct answers. Prior to implementing the algorithm on the system, a system administrator defines which subsets of questions, if answered correctly, are sufficient to authenticate the user and allow the algorithm to decrypt the encrypted secret. By allowing various subsets of answers, the algorithm allows for some error on the part of the user.

The algorithm asks questions to which the user is likely to exclusively know the answer. Such a question, is e. g., "What is the first and last name of your childhood friend?" This information is preferably not available in the public record and would only be known to someone who was very familiar with the user. The question has the further benefit of requiring both a first and a last name, so that anyone attempting to guess the name through trial and error or a via a dictionary attack would have to exhaustively search all combinations of first and last names to find a match. In general, the answers to at least some of the questions may be available in the public record; however, when there are enough other questions in aggregate it will be very difficult for an attacker to correctly find or guess the answers to enough questions to authenticate.

Generally, the more questions that must be answered correctly, and the more secure the questions, the more secure the secret will be. An entity who is not the user, but wishes to obtain access to the digital secret, will find it very difficult to exactly reproduce a sufficient number of correct answers. At the same time, requiring the exact replication of a large number of answers makes it more likely that even a legitimate user will be unable to supply all of the correct answers. The user may have misspelled an answer either during the encryption step or the decryption attempt, or may have forgotten the answers he provided. In this case the user will never be able to recover the data, because the system stores neither the digital secret nor the answers in an un-encrypted form on the system.

Figure 1:
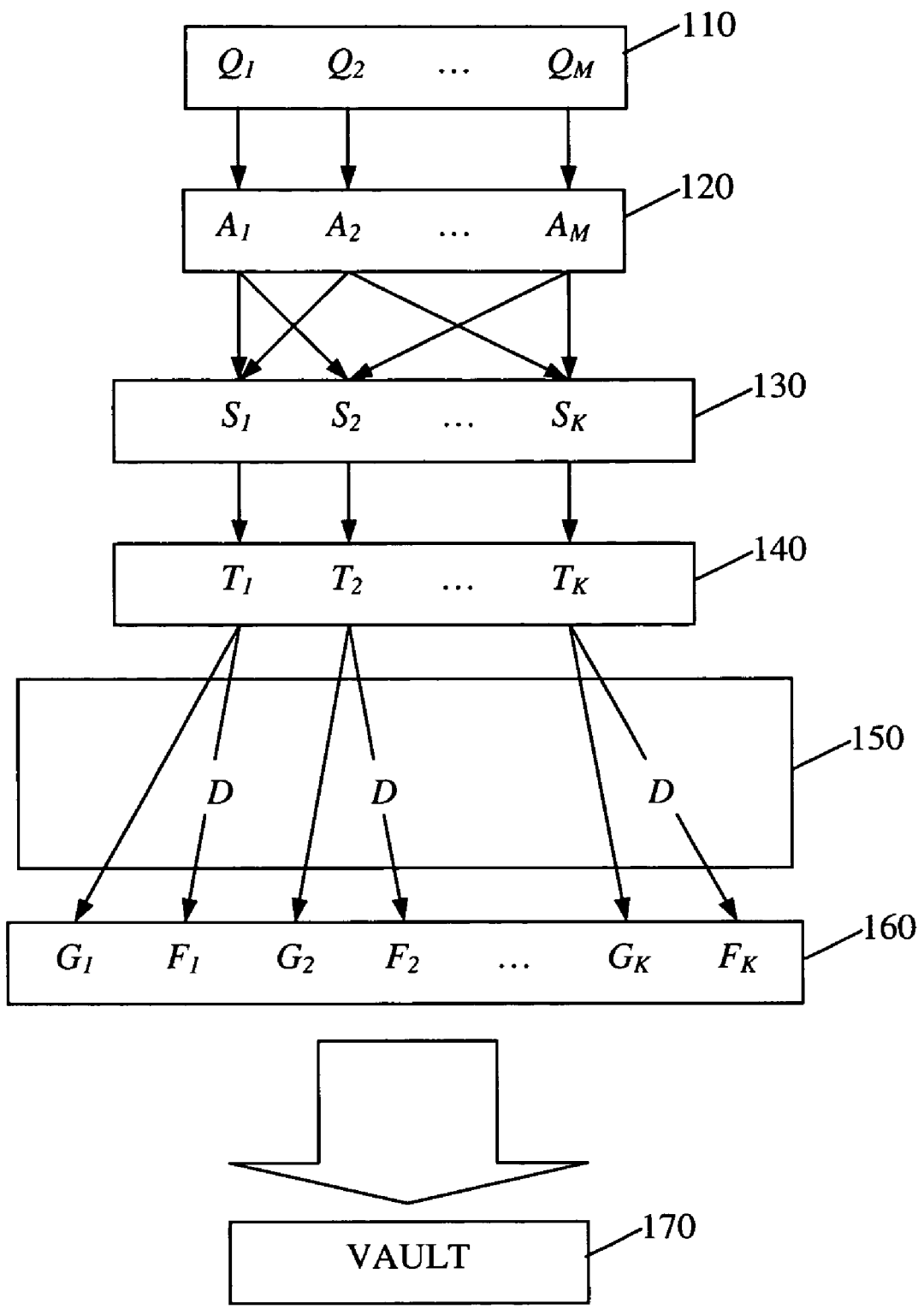
FIG. 1 is a high-level block diagram of encrypting a digital secret into a vault of combinations.

First the encryption and decryption functionality of the algorithm will be described at a high level to aid understanding, and later the different steps of the algorithm will be described in more detail. FIG. 1 shows a high-level flow diagram of the encryption functionality of the encryption algorithm. The algorithm first registers the user by asking him a set of m questions that is stored on the computer (step 110).

The user then inputs a corresponding set of m answers (step 120). The questions are denoted $Q_M$ and the corresponding answers are denoted $A_M$, where M is the index of the question and of the corresponding answer, and $1 \leq M \leq m$. At this step, because the user provides the answers, they are in essence correct by "definition." The user is the authority on the correct answer. In other words, during the decryption phase the algorithm determines whether an entity enters an answer that matches an answer that was provided during the encryption phase. In contrast, other kinds of encryption/decryption algorithms might determine whether user-provided answers are correct by comparing their values to values stored in an external database. For example, a user-provided social security number might be compared to government records to determine whether it is correct for a particular user.

Next the algorithm generates a set of k subsets of answers which, if correct, a system administrator previously determined to be sufficient to authenticate a user (step 130). These subsets are denoted $S_K$, where K is the index of the subset and is unrelated to m or M, and $1 \leq K \leq k$. In the described embodiment, these subsets are made up of sets of n answers, where n is a fixed number that is less than m, the total number of answers. If, for example the algorithm asks the user m=8 questions, then n=6 must later be answered correctly to authenticate the user and decrypt the data. Some example subsets $S_K$ are:

$S_1 = \{A_1, A_2, A_3, A_4, A_5, A_6\}$ $S_2 = \{A_1, A_3, A_4, A_5, A_6, A_7\}$ $S_8 = \{A_3, A_4, A_5, A_6, A_7, A_8\}$

In this case, there are 28 combinations of acceptable subsets. The number of subsets is given by:

$$k = \frac{m!}{n!(m-n)!}$$

Next the algorithm generates a string $T_K$ from each subset $S_K$ among the set of subsets (step 140). Each string $T_K$ contains the answers $A_M$ that belong to $S_K$. Next, the algorithm encrypts digital secret D with each of the strings $T_K$, to form encrypted secrets $F_K$. The encrypted secrets $F_K$ are also called decode strings since they can later be used to recover digital secret D. The algorithm also commits to the strings $T_K$ by mathematically transforming the $T_K$ with the application of a one-way, or irreversible, function (such as a cryptographic hash function) to form commitment strings $G_K$ (step 150). After strings $T_K$ are committed, there is no way to recover them through any decryption process. This generates a set of corresponding encrypted secrets and commitment strings $G_K$ (step 160). Lastly, the algorithm stores all of the resulting $F_K$ and $G_K$ together on the system in the vault (step 170), and erases the answers $A_M$ as well as digital secret D.

Figure 2:
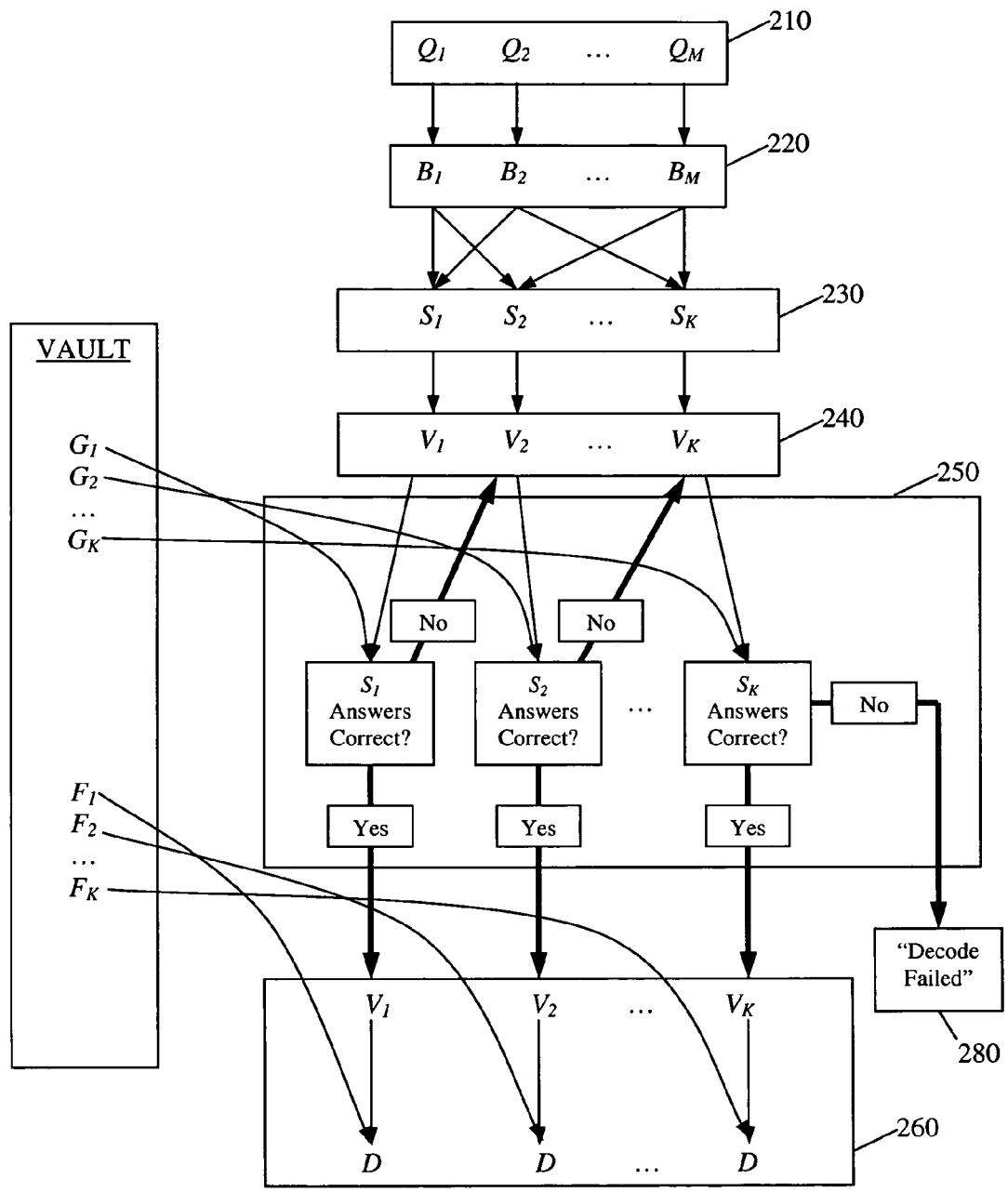
FIG. 2 is a high-level block diagram of decrypting a digital secret out of a vault of combinations.

FIG. 2 shows a high-level flow diagram of the decryption functionality of the decryption algorithm. The algorithm asks the user the same set of questions as in the registration phase (step 210). The user inputs a set of candidate answers, which may or may not be correct (step 220). The questions are denoted $Q_M$ as above, but the corresponding answers are now denoted $B_M$ to signify that they may not be the same as $A_M$, and thus are not assumed to be correct. Next, the algorithm retrieves the set of all the various subsets of answers that are sufficient to authenticate a user if answered correctly (step 230). These subsets $S_K$ are the same as for the encryption step. Next, the algorithm generates a string $V_K$ for each subset $S_K$ among the set of subsets, using the same process as for the encryption phase (step 240). Each string $V_K$ contains the candidate answers $B_M$ that belong to $S_K$. The strings for the decryption step are denoted $V_K$ because they may differ from $T_K$, depending on whether the candidate answers are the same as the original "correct" answers.

The algorithm then retrieves commitment strings $G_K$ from the vault and goes through them in sequence to determine whether the user has provided any answer strings $V_K$ that are correct. First, using the same mathematical transformation as was used to generate the corresponding commitment string $G_1$, the algorithm attempts to generate $G_1$ from string $V_1$ (step 250). If the two match e. g., if the algorithm does generate $G_1$ from string $V_1$, it means the user has provided a subset $S_1$ of correct answers. Then, the algorithm decrypts the encrypted secret by first recalling the corresponding encrypted secret $F_1$ from the vault. Then the algorithm uses string $V_1$ together with encrypted secret $F_1$ to recover digital secret D (step 260). If, instead, the algorithm determines that the user has not provided a subset of correct answers, the algorithm then attempts to generate string $G_2$ from string $V_2$ to determine whether the user has provided a subset $S_2$ of correct answers. Depending on the outcome, the algorithm either decrypts the encrypted secret using $F_2$, or continues testing every other $V_K$ in sequence using the above-described process. If the algorithm exhausts all $V_K$, i. e. determines that none of the subsets of answers are correct, then it outputs "decode failed" and terminates (step 280).

Details of the Encryption Method

Figure 3:
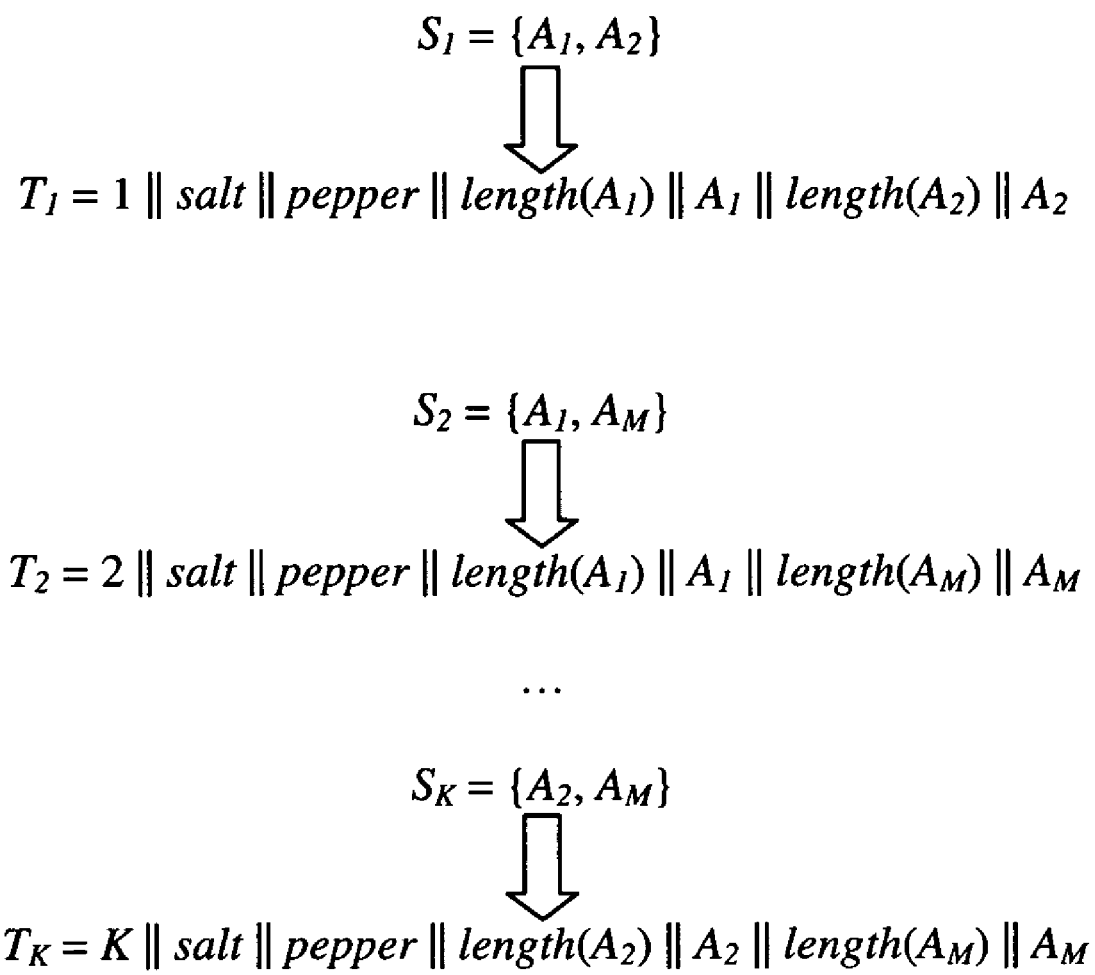
FIG. 3 shows construction of strings from combinations of user-provided answers in the initialization step.

FIG. 3 shows the method the encryption algorithm uses to generate strings $T_K$ from the answers the user provides. It is assumed that the system administrator has already defined which combinations or subsets $S_K$ of correct answers $A_M$ will sufficiently authenticate a user to decrypt an encrypted secret. The algorithm uses these subsets to generate string $T_K$. FIG. 3 does not show all possible subsets, but simply illustrates the process by which the algorithm generates strings $T_K$. Assume $S_1$ contains the set of answers $A_1$ and $A_2$ to questions $Q_1$ and $Q_2$, as previously indicated in FIG. 1. String $T_1$ will contain these answers. The algorithm also includes additional information in $T_1$ that makes it difficult for attackers to guess the answers to questions in order to decrypt the secret. Not only must they guess the answers but they must also guess the additional information included in the strings. The algorithm combines the additional information and the answers in $T_K$ by concatenating them using delimiters, which are denoted by ||.

First, the algorithm provides a label K that identifies to which acceptable answer subset the string corresponds, which is the same value as in FIG. 1. Next, the algorithm concatenates two numbers to the string, identified by the parameters salt and pepper. The first parameter, salt, which is particular to the user, is a semi-secret value that the algorithm stores and recalls from the system without using encryption or decryption processes. In the described embodiment, parameter salt has a size of at least about 20-bytes. The algorithm generates salt using a random number generator during the encryption step. However if the user already has a stored value for salt, i. e. if the user previously used the encryption algorithm, then the algorithm may use this pre-existing value instead.

Including the parameter salt in string $T_K$ requires an attacker to focus an attack on a single user. It does this by making it computationally difficult to attack a number of different users simultaneously. For example, if the algorithm did not include salt in the string then the attacker could construct a candidate string of plausible answer guesses and use that same string to attack every user. If a match was not found for any user, then the attacker could vary the answer guesses in the string and use the new string to attack every user again. However because the algorithm includes salt in the string, the attacker cannot construct a string that would work for more than one user, because the string must contain one user's personal salt value. A string for one user is very unlikely to work for a different user who almost certainly has a different salt value. Thus the attacker must generate a unique string with each unique user's salt value for each attack attempt, and still must guess a sufficient number of answers. While the values of salt are stored semi-secretly on the system and could be even be obtained by an attacker, use of salt in the string in essence limits attack attempts to one user at a time.

Next, the algorithm generates a value for the second parameter pepper using a random number generator, concatenates the value to each of the strings $T_K$, and then erases the value from the system. Preferably, the algorithm calculates the number of pepper bits so that the computational effort is the same regardless of the number of questions $Q_M$, or the number of acceptable subsets $S_K$ in the particular implementation. For example, if there were only two answers in a particular subset $S_K$, then the possible the range of pepper would be made very large in order to increase the computational difficulty of guessing the entire string $T_K$ without knowing the actual answers $S_K$. Or, if there were fifteen answers in a particular subset $S_K$, then the possible range of pepper would not necessarily need to be as large because it would already be computationally difficult to guess the entire string $T_K$ without knowing $S_K$. In this case, it would be preferable to reduce the size of pepper so as to reduce the computational burden somewhat. A preferred number of pepper bits is given by $X-\log_2(k)$, where X is a parameter that reflects the total desired number of additional bits of security that would be feasible to add if there was only a single acceptable subset and k is the total number of answer subsets. For the described embodiment, where n questions out of m total questions must be answered correctly in order to authenticate, a preferred number of pepper bits is given by:

$$X - \log_2\left(\frac{m!}{n!(m-n)!}\right)$$

X=20 is a preferred value to discourage an attacker who has access to the typical computational power available at the time of filing. In general the total number of pepper bits should be large enough to significantly increase the computational difficulty of an attacker guessing its value, and at the same time small enough that a legitimate user can search the possible pepper values in a reasonable amount of time (e. g., 1 second). Alternatively, instead of working with an integer number of pepper bits, once can work directly with the pepper value range. In this case, a preferred range for the pepper is between 1 and $2^X/k$.

The exact value of pepper is constrained to a range between a lower bound, min, and an upper bound, max. In a typical case, min=1, and max reflects the upper limit for pepper as well as the total number of possible pepper values. For a desired parameter X as defined above, pepper will have a range of size $2^X/k$. Though the algorithm erases the value of pepper, it stores the range bounds min and max as semi-secret information on the system. Including pepper in string $T_K$ greatly increases the computational effort required for a successful attack by a factor equal to the size of the range of pepper. An attacker must correctly guess the correct value of pepper, a large random number, at the same time as guessing a sufficient number of correct answers. For every unique subset of answer guesses, the attacker must exhaustively guess all possible values of pepper within the given range before being able to determine whether the answer guesses are correct. If the attacker cannot authenticate to the system even after guessing all pepper values then the answer guesses, can be assumed to be incorrect. Then the attacker must vary the answer guesses and again exhaustively guess all possible values of pepper in order to again attempt to authenticate. This process greatly increases the amount of computational effort an attacker must make to attempt to attack a user.

Note that even when a legitimate user attempts to decrypt the digital secret, he must also guess the value of pepper, since the algorithm erases the exact value during the encryption phase. However, because a legitimate user possesses the correct answers to the questions, the computational time required to guess the value of pepper is not prohibitive. For an attacker who must guess the answers in addition to the value of pepper, the computational time is increased significantly.

After the algorithm concatenates the parameters salt and pepper, then it concatenates with the string information pertaining to the answers $A_M$ for subset $S_K$ that corresponds to $T_K$. For each answer $A_m$ in the subset, the algorithm concatenates a value length($A_m$) that signifies the length of that answer. By adding the length of each answer, each string unambiguously encodes a single set of answers. The unambiguity ensures that attacks which attempt to guess more than one combination at once are not possible. Other unambiguous coding methods such as using delimiters and escape codes, can also or instead be used. Then the algorithm concatenates the correct, user-provided answer. The result is a string $T_K$ that includes a particular subset or combination, of correct answers. In a sense, each $T_K$ is a different composite password for the user. Including pepper and salt helps to purposefully delay a potential attacker who is attempting to guess the answers, but they are not essential to the algorithm. In general, any method of including combinations of answers to form strings $T_K$ can be used.

Figure 4:
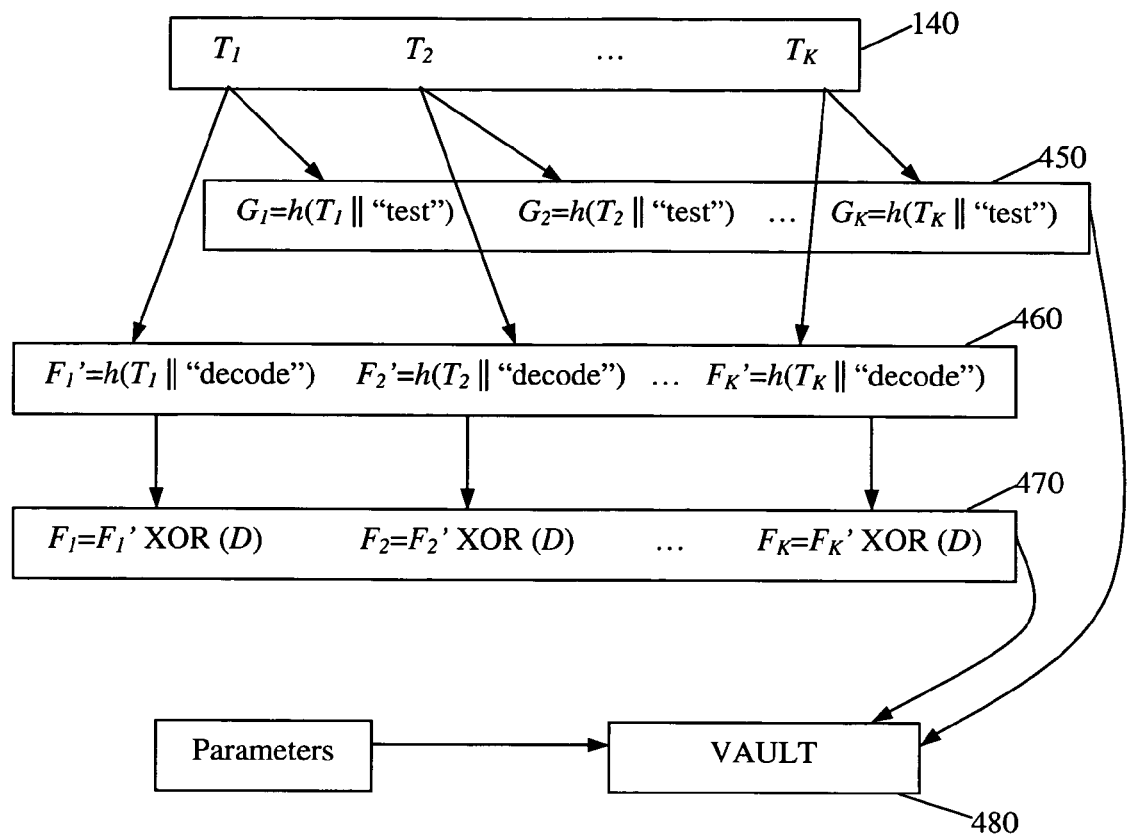
FIG. 4 shows data encryption using hash functions, and the generation of the vault of combinations.

FIG. 4 shows the encryption algorithm used for encrypting digital secret D with strings $T_K$ that are generated as described above (step 140), and storing the encrypted data in the vault. The algorithm uses each string $T_K$ twice during the encryption process. First the algorithm commits to the strings $T_K$ with a one-way function to generate a corresponding commitment string $G_K$. Commitment string $G_K$ provides a way to check during the decryption phase, whether an entity knows a subset of correct answers sufficient to authenticate to the system. Next, the algorithm uses an encryption protocol using strings $T_K$ to encrypt digital secret D to generate an encrypted secret string $F_K$, also called a decode string. Later in order to decrypt the encrypted secret, $G_K$ is used to test whether a user possesses $T_K$, e. g., knows a sufficient subset of correct answers. If so, $T_K$ can be used as a decryption key for $F_K$. After generating the secret and commitment strings, $F_K$, and $G_K$ respectively, the algorithm stores them together in the vault for later use in the decryption phase.

To generate commitment string $G_K$, the algorithm appends the string "test" to each string $T_K$, and then executes hash function h on the result (step 450). This generates a string of characters $G_K$ that appears to be random, but actually corresponds to and commits to, answer strings $T_K$. The hash function has the feature of being a one-way function, which makes it computationally easy to calculate $G_K$ from $T_K$, but computationally infeasible to calculate $T_K$ from $G_K$. This makes it difficult for an attacker to extract the correct answers from $G_K$. The hash function also has the feature of yielding an output of a particular length, which is independent of the input length. Therefore h outputs commitment strings $G_K$ that are all the same length, even though the strings $T_K$ may contain different numbers of letters. In the described embodiment, the algorithm uses a hash function h that yields commitment strings $G_K$ that are at least as long as the digital secret D, for reasons that are discussed more fully below To generate decode string $F_K$, the algorithm first appends the string "decode" to each $T_K$ and executes hash function h on the result (step 460). This generates a string of characters $F_K'$ that appears random but actually corresponds to and can be easily calculated from answer string $T_K$. Both $F_K'$ and $G_K$ encode the same string $T_K$. They also are the same length as each other, because hash function h outputs strings that are all the same length. However, the characters in string $F_K'$ are with very high probability entirely different from those in $G_K$. This is because varying even one character in the input to a hash function results in an output that is completely different. Thus adding the different strings "test" and "decode" to $T_K$ results in corresponding strings $G_K$ and $F_K'$, which appear to be unrelated to each other even though they both encode the same answer string. This is important because, as described below, the digital secret D is subsequently encrypted with $F_K'$. In other words, $F_K'$ will be an encryption key for the encrypted digital secret and is erased after its use whereas $G_K$ is retained. If strings $G_K$ and $F_K'$ were the same, then string $G_K$ could also be used as an encryption key for the encrypted digital secret. But this would be undesirable because $G_K$ is stored together with the encrypted secret in the vault, and thus would be simple to use to decrypt the secret. This problem is avoided by ensuring that $G_K$ is a different string of characters than $F_K'$, even though strings $G_K$ and $F_K'$ are derived from the same useful information. It should be noted that there is a very small chance that two unique strings, e. g., strings with different salt values and/or answers and/or different appended character strings will yield the same value when hashed. This is known as a "hash collision." For example, if using the SHA1 hash function, the chances that two random strings hash to the same value is about $1:2^{160}$. In other words, there is a non-zero but extremely low probability that a string containing one or more incorrect values will produce a string having the same characters as $G_K$.

After generating string $F_K'$, the algorithm combines it with digital secret D. The algorithm does this by performing an exclusive-or (XOR) function of digital secret D with $F_K'$, to generate string $F_K$ (step 470). Note that string $F_K'$ must be at least as long as digital secret D in order for the algorithm to properly execute the XOR function. If $F_K'$ is longer than D, then the algorithm selects the first d bits of the hash function output $F_K'$, where d is the length of the digital secret D, and performs an XOR function of digital secret D with those bits, to generate string $F_K$. Thus string $F_K$ is derived from answer string $T_K$ as well as digital secret D. However $F_K$ appears to be random because it is derived from $F_K'$, which appears to be random. Because $F_K$ is derived from $F_K'$, the output of a one-way hash function, it is computationally difficult for an attacker to obtain the answers or digital secret D from it.

As mentioned previously, the algorithm uses a hash function h that yields output strings of a necessary length, e. g., are at least as long as digital secret D. The algorithm also uses a hash function h that has sufficient security for the application. Hash functions such as MD5, SHA-256, SHA-512, SHA-1, SHA-224, SHA-384, and HAVAL are examples of hash functions that can be implemented in the algorithm.

It should be noted that there is a very small chance that two distinct strings, e. g., strings with different salt values and/or answers, will yield the same value when hashed. This is known as a "hash collision." For example, if using the SHA1 hash function, the chances that two random strings hash to the same value is about $1:2^{160}$. In other words, there is a non-zero but extremely low probability that a string containing one or more incorrect values will reproduce $G_K$.

After encrypting the digital secret and the answers, the algorithm stores strings $F_K$ and $G_K$ together, along with a set of parameters in the vault (step 480). The parameters include: the number of questions; a description of the acceptable answer subsets $S_K$; the length of digital secret D; the values of salt, min and max; and an identifier for the hash function that was used to encrypt the secret. The parameters aid later decryption of the data, but are by themselves insufficient to assist an attacker in any significant way. For example, for an implementation where any 6 out of 8 questions may be answered correctly to authenticate, a description of the acceptable subsets SK may consist of the values "8" and "6," or even simply "6," stored in a way that is meaningful to the algorithm during the decryption phase. After the algorithm stores strings $F_K$, $G_K$, and the set of parameters in the vault, it then erases the digital secret, the answers $A_M$, and the value of pepper. All intermediate values such as $T_K$, $F_K'$, and the lengths of the answer strings are also erased. Additionally, any computer memory used in the process should be zeroized, or cleared to avoid the possibility of leakage of this intermediate data Thus the data saved on the computer is meaningless to anyone without independent possession of a sufficient number of correct answers. The size of the data generated for the vault is given roughly by 2 hK where h is the length of the hash output and K is the total number of subsets. For the described embodiment, where n questions out of m total questions must be answered correctly in order to authenticate, the size of the data generated for the vault is given roughly by:

$$2h\left(\frac{m!}{n!(m-n)!}\right)$$

where m is the total number of questions, and n is the number of questions that must be answered correctly in order to authenticate to the system. The storage of the parameters contribute negligibly to the size of the vault.

Details of the Decryption Method

The decryption algorithm begins the decryption phase by asking the user the same set of questions $Q_M$ that it used for the encryption phase. Then the user provides corresponding candidate answers $B_M$, which may be right or wrong. The algorithm generates strings $V_K$ from these answers, by using the information about subsets $S_K$ and parameters salt and the upper and lower pepper bounds, min and max, stored in the vault in the encryption phase. Then the algorithm uses strings $V_K$ to attempt to decrypt the digital secret that was encrypted and stored in the vault in the encryption phase.

Figure 5:
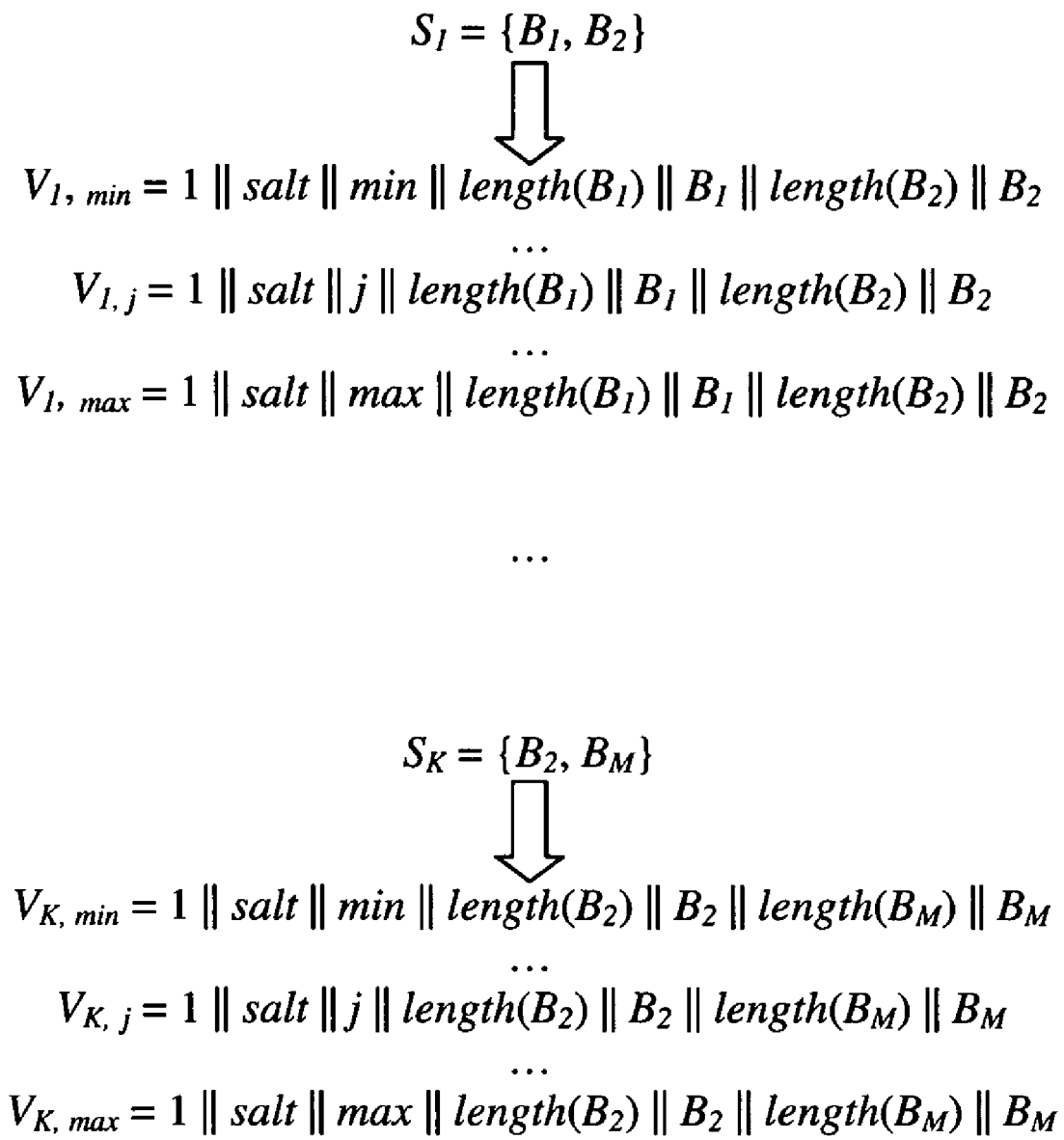
FIG. 5 shows construction of strings from combinations of user-provided answers in the initialization step.

FIG. 5 shows the method the decryption algorithm uses to construct strings $V_K$ from the candidate answers $B_M$. It does this by using a similar method to that used to construct strings $T_K$ in the encryption phase, which is shown in FIG. 3. First the algorithm provides a subset number K that identifies to which acceptable subset $S_K$ the string corresponds. Next, the algorithm concatenates K with the value of salt. Then the algorithm concatenates a value for pepper. The algorithm erased the actual value of pepper at the end of the encryption phase, and so in the decryption phase it must find the value that was used, beginning with min, the lowest possible value in the pepper range. The algorithm must find the actual value of pepper, otherwise it will not be able to decrypt the encrypted secret. Because pepper can take any value between min and max, there are (max−min)+1 possible values of pepper. For each subset $S_K$, the algorithm generates (max−min)+1 strings $V_K$, each with a different value of pepper. These strings are denoted $V_{K,j}$ where j is an index of the pepper guess. For the minimum value of pepper, j=min, and for the maximum value of pepper, j=max, i. e. min≦j≦max.

Generating this many strings adds a significant computational burden to the decryption process. For an entity, e. g., an attacker who has to guess not only the answers, but also the random pepper value, this burden will be substantial, thereby significantly increasing the time required to guess a combination of correct answers. For a legitimate user, who knows the correct answers, the computational burden is much less.

Next, the algorithm concatenates information pertaining to the candidate answers $B_M$, such as the number length($B_M$) signifying the length of the candidate answer, and the candidate answer. This produces a string $V_{K, j}$ with a particular subset of candidate answers and a guess for pepper. But for each subset $S_K$ of candidate answers $B_M$, the value of pepper must be guessed, so a series of strings $V_{K,j}$ must be produced each having a different pepper value. For subset $S_1$, the first string is $V_{1, min}$, where min is the lowest possible pepper value in the pepper range, and the last string for subset $S_1$ is $V_{1, max}$, where max is the greatest possible pepper value in the pepper range. Similarly, for any subset $S_K$, the first string is $V_{K, min}$ and the last string is $V_{K, max}$.

Figure 6:
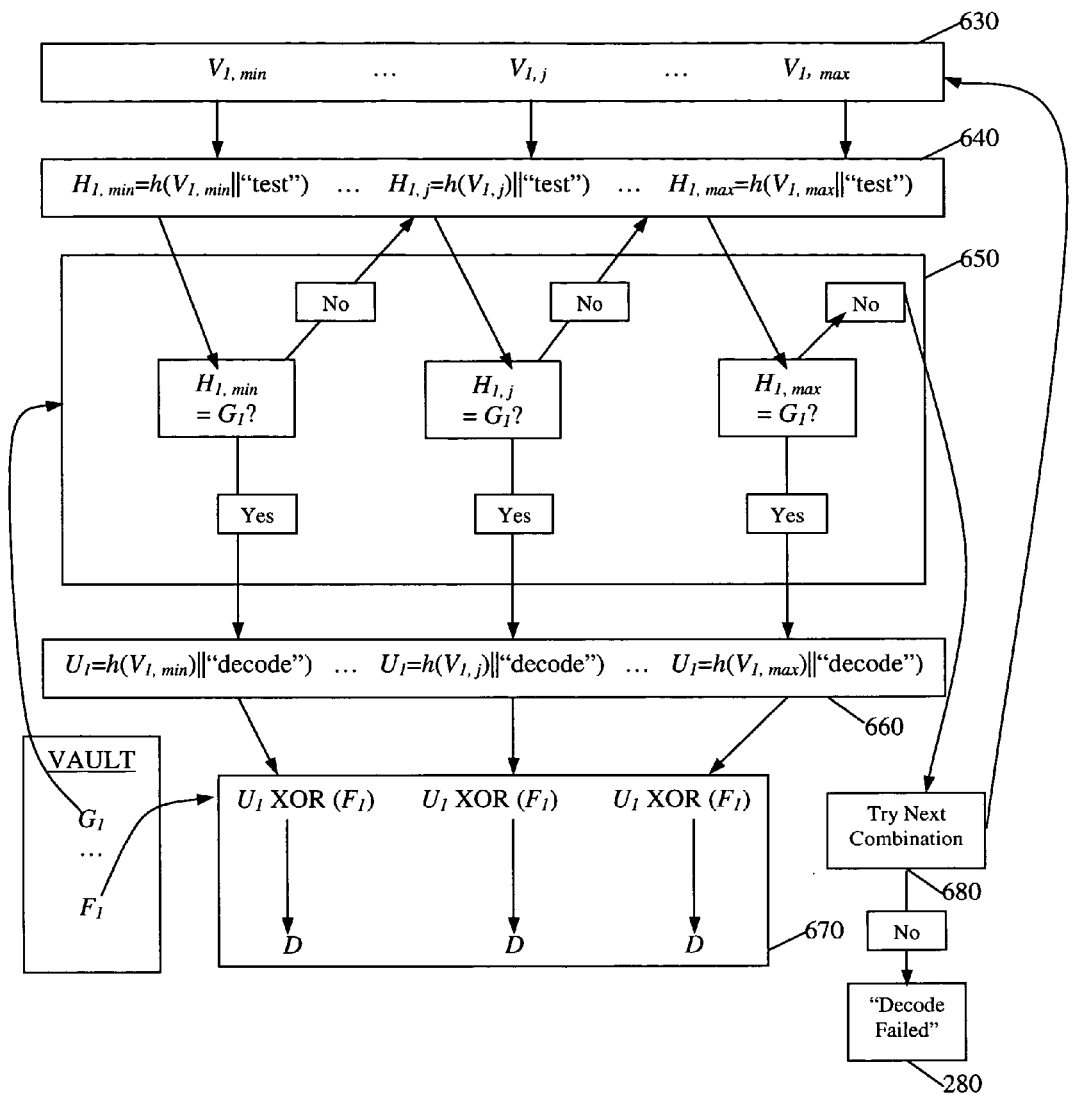
FIG. 6 shows the method used to attempt data decryption out of the vault of combinations.

FIG. 6 shows how the algorithm uses the set of candidate answer strings $V_{K, j}$ (generated in step 630) to attempt to decrypt the encrypted secret stored in the vault. It does this by sequentially processing each string $V_{K,j}$ in the same way $T_K$ was processed during the encryption process, in an effort to determine whether the results will be identical to $G_K$. If, for any string $V_{K,j}$, a string $G_K$ is reproduced, then the algorithm uses string $V_{K,j}$ to decrypt the secret encrypted in secret string $F_K$.

To generate a first candidate test string $H_{1, min}$, the algorithm appends the string "test" to string $V_{1, min}$, and then executes hash function h on the result (step 640). Hash function h is the same as for the encryption step. This generates a string of characters $H_{1, min}$ that encodes the candidate answers, and has the same length as the corresponding commitment string $G_1$ that encodes the correct answers and is stored in the vault. The algorithm then compares test string $H_{1, min}$ to $G_1$ (step 650).

If and only if the string $T_1$ used to generate $G_1$ is the same as the string $V_{1, min}$ used to generate $H_{1, min}$, will $G_1$ and $H_{1, min}$ be equal (unless an unlikely "hash collision" between an incorrect string and $G_1$ occurs). This condition means that the string $V_{1, min}$ contains the correct answers and the correct value of pepper and signals the algorithm to begin the process of decrypting the encrypted secret. In other words $V_{1, min} = T_1$. The algorithm derives a decryption key from answer string $V_{1, min}$. A key derived from a string with incorrect answers would not operate to decrypt the encrypted secret, which was encrypted with the correct answers. To derive the encryption key, the algorithm appends the flag "decode" to $V_{1, min}$ and executes hash function h on the result, to produce $U_1$ (step 660). In this case because the answer string is correct $U_1 = F_1'$. Next, the algorithm executes an XOR function of $U_1$ with $F_1$ (step 670). This successfully decrypts digital secret D from $F_1$.

If even one letter of the candidate answer string $V_{1, min}$ is incorrect, or if the guessed pepper value of min is incorrect, then $H_{1, min}$ will with very high probability not match $G_1$ (step 650). This condition signals the algorithm not to decrypt the encrypted secret but instead to guess the next value of pepper such that j=min+1. The algorithm chooses a new string $V_{1, j}$, where j=min+1 (step 240). Then the algorithm inputs this new string appended as before with the flag "test," into hash function h to generate $H_{1, j}$ (step 640). Then the algorithm compares $G_1$ to $H_{1, j}$ (step 650). If it finds the two to be equal, then the algorithm repeats steps 660 and 670 as described above, using the new $V_{1, j}$ where j=min+1 to decrypt digital secret D from $F_1$. If it finds the two are not equal, the algorithm repeats steps 640 and 650 as described above for the next value of pepper. It continues incrementing the value of pepper until a match is found or until all possible values for pepper have been used.

If the algorithm exhausts all j in the range min≦j≦max, then that at least one of the answers from which $V_{1, j}$ is constructed is incorrect. The algorithm then resets j to min and tries the next acceptable combination of answers (step 680) $V_{K, min}$ where K=2. It then repeats the above-described steps for this next string. If the algorithm finds no match between $G_K$ and $H_{K,j}$ for any combination of j and K, then the algorithm outputs "decode failed" and terminates (step 280).

In the above-described encryption algorithm, the digital secret D is assumed to be of a fixed length and the output of hash function h must be at least as long as digital secret D. Otherwise the algorithm cannot properly execute an XOR function of decode string $F_K'$ with the digital secret, to encrypt the secret into string $F_K$. This is sufficient in practice since a well protected digital secret D can be used to protect any other secret by means of using it as an encryption key. An alternative algorithm, that allows encryption of a digital secret of any length, uses an encryption function E other than the XOR function to encrypt digital secret D. In this case, the encryption algorithm executes the first part of the encryption phase as described above. The algorithm generates answer string $T_K$ from subset $S_K$ of correct answers $A_M$. Then it operates hash function h on $T_K$, to produce commitment string $G_K$ that encodes the correct answers. However to encrypt the secret, the algorithm does not generate decode string $F_K'$ and XOR it with the digital secret, as described previously. Instead, the algorithm generates a decode string $F_K'$, which is used as the key to a symmetric encryption function. The digital secret D is encrypted using $F_K'$ as the key, producing string $F_K''$. Encryption function E can be, for example a symmetric key encryption algorithm such as the DES, 3DES, or AES algorithms. The algorithm stores encryption output strings $F_K''$ in the vault but does not store strings $G_K$. In this implementation salt and pepper can also be included in the strings, using the methods described previously. Alternatively, a stream cipher algorithm such as the RC2, RC4, RC5, SEAL algorithms, or the AES algorithm in stream cipher mode, for example could be used as the encryption algorithm E. Standard ISO/IEC 18033-4 standardizes several dedicated stream ciphers.

The decryption algorithm executes the first part of the decryption phase as described previously. The algorithm generates candidate answer string $V_K$ from subset $S_K$ of candidate answers $B_M$. Then it operates hash function h on $V_K$, to produce candidate test string $H_{K, j}$ that corresponds to, or commits to, the candidate answers. As described previously, the test string $H_{K, j}$ is compared with the stored $G_K$ to determine if the candidate answers $B_M$ in subset $S_K$ are correct. If a match is found these same answers $B_M$ in subset $S_K$ are used as the key invert with the encryption function E to decrypt string $F_K''$ and obtain the digital secret D. If a match is not found, then the algorithm tries again with a next test string, e.g., $H_{K, j+1}$.

Encryption function E can also be used in a somewhat different manner to encrypt and decrypt digital secret D. For example, decode string $F_K'$ can be generated using answer string $T_K$ and hash function h as described above and used as an encoding/decoding key. Decode string $F_K'$ is used as a key to encrypt digital secret D using encryption function E, e.g., AES, producing encryptions of the secret $E_K = E(D)$ that are stored in the vault. Also, the digital secret is committed with a hash function, creating result Z=h(D), which is stored in the vault. Then, to decrypt the encrypted secret, candidate answer string $V_K$ is hashed to produce a candidate test string $U_K'$, which may be wrong and thus different from decode string $F_K'$. Candidate test string $U_K'$ is used as a decryption key to attempt to decrypt $E(D)$. The resulting candidate secret $D'$ is then hashed, producing $Z'=h(D')$, and compared to the hashed actual secret $Z=h(D)$. If the two are the same, then digital secret D was correctly decrypted with candidate answer string $V_K$. This algorithm has the advantage that the resulting vault data requires roughly half the storage space as that of the previously described algorithm because $G_K$ is not stored in the vault.

Alternately, the step of committing the digital secret D with a hash function can be skipped, and instead the secret can be encrypted with an encryption function E with integrity protection, and using $F_K'$ as an encryption key. An encryption function with integrity protection is a function that does not produce a wrong value when it is given a wrong key. Instead, the function simply outputs "fail" when given the wrong key. Thus if candidate test string $U_K'$ is incorrect, and does not correctly decrypt $E_K=E(D)$, then the algorithm outputs "fail." This algorithm also has the advantage of a reduced vault data size because $G_K$ is not stored in the vault.

Another algorithm that allows encryption of a digital secret of any length produces decode string $F_K$ using the hash function h and XOR function as previously described. Decode string $F_K$ encodes answer string $T_K$ and the digital secret. However, instead of producing a commitment string $G_K$, for the Kth subset the algorithm operates hash function h on the digital secret producing a commitment to the digital secret D, $Z=h(D)$ and also stores that result Z in the vault along with $F_K$. When it comes time to access the secret, the decryption algorithm generates candidate answer strings $V_K$ from subset $S_K$ of candidate answers $B_M$. Then it operates hash function h on $V_K$, to produce candidate test string $U_K$ that encrypts the candidate answers. It then XORs this with the stored $F_K$ in an attempt to extract the digital secret, D. To determine whether the extracted quantity D', e.g., the potentially correct secret, is indeed the digital secret, it hashes it and compares the result $Z'=h(D')$ with the stored hash value $Z=h(D)$. If it matches, the correct secret D' has been extracted; if not, the algorithm moves to the next subset. This algorithm also has the advantage of a reduced vault size because $G_K$ is not stored in the vault.

Another algorithm that allows encryption of a digital secret of any length uses a key derivation function, such as PBKDF from PKCS#5, to derive a key $J_K$ from the answer string $T_K$. A key derivation function can produce keys of any desired length, so $J_K$ can be generated such that it has a length that is optimal for its purpose. For example, $J_K$ can have a length that is exactly the same as D, and can be used to encrypt D with an XOR function. Or, for example, $J_K$ can have a length that is sufficient to make it computationally difficult to guess, 128 bits for example, and can be used as an encryption key to encrypt D with an encryption function E. Then to decrypt D, if the user provides a correct subset of answers, $J_K$ can be reproduced using the key derivation function and used as a decryption key. Whether the answers are correct can be verified using an appropriate method. Additionally within this algorithm the key derivation function can be used to create the test strings $G_K$ as an alternative, for example, to creating $G_K$ with hashing, creating $G_K$ with iterated hashing, employing encryption with integrity protection, or adding a commitment $Z=h(D)$ to the digital secret to the vault.

Figure 7:
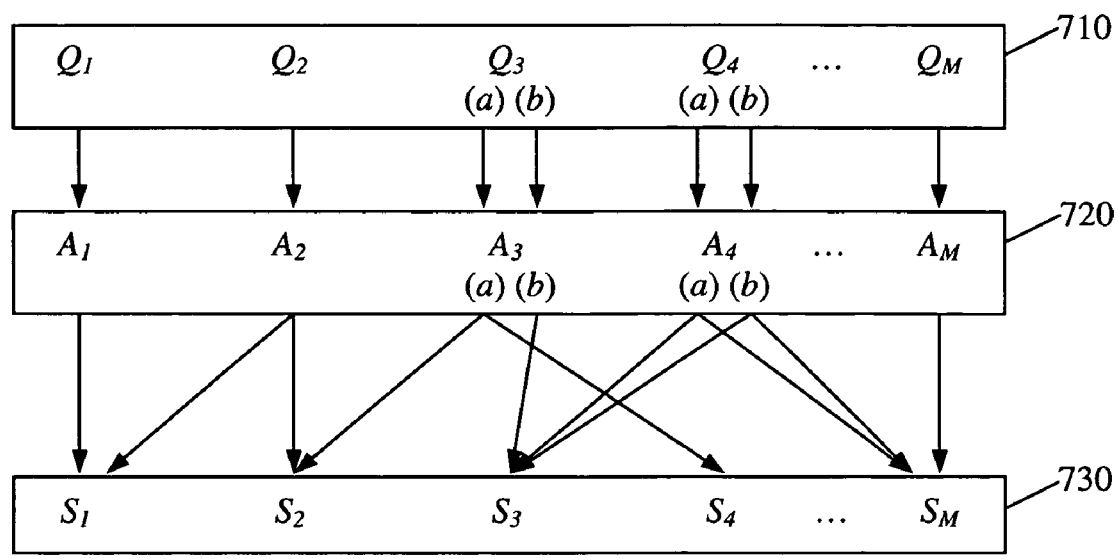
FIG. 7 shows the selection of acceptable subsets of answers to multiple-part questions.

Instead of using questions for which a single answer is expected, one could use multiple-part questions to which multiple answers are expected, or acceptable. This can potentially strengthen the security of the digital secret encryption and at the same time make the system easier to use. FIG. 7 illustrates how such a system would work. The algorithm asks a set of questions $Q_M$ (step 710). Questions $Q_1$ and $Q_2$ are single part questions. Questions $Q_3$ and $Q_4$ each have two parts (a) and (b). $Q_3$ is a question for which either (a) or (b) alone is sufficient to authenticate the user, when combined with answers to other questions. $Q_4$ is a question for which both (a) and (b) together must be provided in order to sufficiently authenticate the user, when combined with answers to other questions. The user provides a set of answers $A_M$ (step 720). The algorithm divides them into a set of acceptable answer combinations $S_K$ (step 730). In this example, $S_1$ contains the answers to single-part questions $A_1$ and $A_2$. $S_2$ contains the answers to single part question $A_2$ and to part (a) of $A_3$. $S_3$ contains the answers to part (a) of $A_3$ as well as parts (a) and (b) of $A_4$. Any combination of single-part and multiple-part questions can be implemented, so long as the security of each part of each question is assessed such that the subsets are sufficiently secure for user authentication. In this algorithm the $S_K$ denote acceptable answer combinations rather than acceptable subsets of questions, where K is the answer combination number.

For question sets that include multiple part questions, acceptable subsets can also be defined simply with question numbers, instead of defining the $S_K$ to be acceptable answer combinations in terms of the question part numbers such as 3(a) or 4(b). Then if a user answers a single part of a multiple part question, that question is counted as "answered." This technique can be further refined by associating multiple answer strings, e.g., $T_{K,1}, T_{K,2} \ldots$ corresponding to different answer combinations for different question parts that the user may answer, with each subset $S_K$. In some cases all parts of a question are required, which in a sense makes each part its own question. In other cases, only part of a question, which can be the user's choice, are required. Here, because the question can be answered in one of a plurality of different ways, defining appropriate answer strings only by the subscript K is not entirely appropriate, because even a particular subset $S_K$ may have different possible answers.

The above-described methods for defining subsets $S_K$ for multiple-part questions are equivalent to treating each question part as a separate, independent question. For example, a two-part question can be considered two questions. An advantage of this approach is that the definition of acceptable question combinations or subsets is somewhat simplified, because there is one answer expected per question, and one string $T_K$ for each subset or combination $S_K$. In general, there is some ambiguity in the definition of "question" as opposed to "question part"; therefore, it should be understood that subsets $S_K$ can be defined in any way that is appropriate to reflect the various combinations of questions that are sufficient, if answered correctly, to authenticate a user.

In a further modification, one can assign an integer value or "weight" to each answer $A_M$. The "weight" relates to the security of the corresponding questions $Q_M$. For example, a question such as "What city were you born in?" the answer of which can be found in the public record, might carry a relatively small weight. In contrast, a question such as "What is the first and last name of your childhood friend?" the answer of which is both unavailable in the public record and difficult to guess, might carry a relatively large weight. If the user provides the correct answer to this question (or one of similar difficulty), then he would need to answer very few other questions correctly in order to securely authenticate to the system. In order to authenticate, the user then must provide the answer to a number of questions such that the sum of their "weight" values meets or exceeds a pre-determined threshold which essentially reflects the total difficulty or security of the questions answered. This sort of algorithm would make it possible for the acceptable subsets to be automatically determined from the security properties of the individual questions. This flexibility would make it easier for the system administrators and legitimate users to use the system. A more refined approach might assign more than a single weight measurement to each question. For example a question could be assigned a measure of entropy as well as a measure of risk of discoverability due to public availability. The acceptable subsets could be determined as a custom function of all available statistics concerning the questions and user population concerned.

There are multiple variations of the techniques described herein. For example, instead of specifying which specific subsets are acceptable, one could require the user to provide correct answers to a certain threshold number $k_t$ of questions, in order to authenticate to the system. Then the acceptable subsets $S_K$ would automatically consist of all the subsets of questions that contain exactly $k_t$ answers. Or, for example, some of the questions and/or parts of multiple-choice questions could be provided without any preference to order. In this case, the algorithm identifies the questions for which the order of provided answers is irrelevant. The algorithm could associate a distinct answer string $T_K$ for each possible order. A simpler solution is to have the algorithm alphabetizes the provided answers. An acceptable subset $S_K$ is formed from the resulting order of answers. For example, in the case of a multiple part question such as "What are your two favorite movies?" the user could enter the movies in either order. This feature can enhance usability of the system since the user would not have to remember the order in which the answers were registered.

The algorithm also can present the user with a relatively large number of questions during registration (e. g., 50), and allow the user to select and answer a predefined number of the questions (e. g., 8). This is useful because in some cases there may be questions that the user cannot answer, or would prefer not to answer. For example, a question may be "What is your dog's name?" If the user does not have a dog, it would be preferable to allow the user to select a different question to answer. Allowing a user to select the questions can be useful in allowing the user to avoid questions for which he knows the answers are readily available. For example, the answer may be a piece of information that he publicly shares on a web page. The questions can also be grouped into "question themes" which can allow the user to more easily find and select the questions he prefers. Even if the user is allowed to select the questions from among e. g., 50 questions, m equals the number of questions selected by and answered by the user.

One feature that can be added to any of the above-described implementations is to display the answers to all of the questions after the user authenticates to the system. The algorithm can do this by appending a list of the correct answers $A_M$ to the secret prior to encryption. Alternately, the answers can also be encrypted with the digital secret D using an encryption function. In either case, whenever the user successfully decrypts the encrypted secret, the algorithm can recover the list of correct answers and display it to the user. In this way, the user can remind himself of answers he may have forgotten. He also can have the option of updating one or more answers, if he re-encrypts the secret. In this case the algorithm would subsequently re-encrypt the secret with the updated answers.

The subsets of answers can be "hardened," or made computationally more difficult for an attacker to guess, by performing iterations of hash function h on strings produced during the encryption phase of the algorithm. As described above, commitment strings $G_K$ are the output of hashing the argument $T_K\|$"test". This output can be further hardened by iteratively hashing it, i. e. performing $h_p(G_K)$, where the notation $h_p$ is intended to denote iteratively performing hash function h for p times on the output of the previous hash operation. Similarly, strings $F_K'$ are the output of hashing the argument $T_K\|$"decode". This output can be further hardened by iteratively hashing it, i. e. performing $h_q(F_K')$, where the notation $h_q$ is intended to denote iteratively performing hash function h for q times on the output of the previous hash operation. Then $h_q(F_K')$ is used to encrypt digital secret D. The parameters p and q are stored semi-secretly on the system. In order for an attacker to be able to attempt to guess $h_q(F_K')$ and thus decrypt the digital secret, an attacker would have to guess the string of answer guesses and then hash that string q times. This can greatly increase the computational time required for an attacker to execute a number of guesses at the answers. A legitimate user must also hash an answer string q times, but because he knows the correct answers the computational difficulty is not prohibitive. Parameters p and q can have values that are selected in a way that is analogous to the way that pepper is chosen, i. e., that they discourage an attacker by increasing the amount of computational work required to guess answers by a sufficient amount, and that they do not pose a significant computational barrier for a legitimate user, who knows the correct answers. In a sense, parameters p and q perform a comparable function to pepper. An advantage of using iterated hashing technique is that it can be used in place of pepper, and it may be also useful to omit the pepper in case the user does not have a strong source of randomness from which to generate the random pepper value. Alternately, a key derivation function such as PBKDF2, which can be referenced from PKCS#5, can also be used to generate from $T_K$ a value that is used to commit to subsets of answers and a value that is used to encrypt digital secret D. Then to attempt to decrypt the encrypted digital secret, an attacker would have to execute the key derivation function on each string of answer guesses. This can significantly add to the amount of computational effort required of a potential attacker, and thus may help to discourage an attack. A legitimate user possessing the correct answers would have to execute the key derivation function only once, and thus the required computational time is not significant.

The system can be adapted to include a remote server, which can be used to store questions for multiple users. Each user has an associated identifier, which the server also stores. At the beginning of the encryption phase, e. g., registration the encryption algorithm downloads a set of questions to the user's computer (e. g., client) and presents them to the user. As discussed above, the number of questions in the set can be larger than the actual number of questions that, if answered correctly, are sufficient to authenticate. In this case, the user selects and answers an appropriate number of questions, which the algorithm then associates with the user, e. g., with the user identifier. After encrypting the digital secret using acceptable combinations of the answers, information identifying the answers, and the user identifier, are stored as parameters in the vault. The vault can also be stored on the server. During the decryption phase, the user specifies his identifier, and the algorithm downloads the vault and appropriate questions to the user's computer. Each user's salt value can also be stored on the remote server. In general, using a remote server to store at least part of the information used by the algorithm can be useful because it avoids the need to store information on the user's computer. For example, this algorithm can allow the user to "roam," and be able to access the encrypted digital secret D from a networked computer.

When authentication or vault material is stored on a remote server, it can be useful to protect this data. This can be accomplished with a type of user or machine authentication. For example, when the user's computer is part of a local area network or domain, a domain-level password authentication could take place between the user's machine and the server. This would permit the user to download the vault to his computer, but an adversary who did not have this authentication material could not even download the vault. This provides an extra barrier for the attacker, before he even attempts to open the vault. It can also be useful in cases where a user switches computers or desires to download a vault onto multiple computers or devices The acceptable subsets of answers can also be used to remotely authenticate a user. For example, the commitment strings $G_K$ are stored on the remote server, but encrypted secrets $F_K$ are neither computed nor stored, because in this case there is no digital secret. During the decryption phase, the user provides candidate answers $B_M$, and the algorithm calculates candidate test strings $H_K$ as described above. However, instead of verifying locally whether $H_K=G_K$, the algorithm sends $H_K$ to the remote server, which compares $H_K$ to stored commitment strings $G_K$. If any $H_K$ matches $G_K$, the server accepts the user as authentic; otherwise the server rejects the user. The $H_K$ can be considered to be "multiple authenticators," or passwords derived from acceptable subsets of answers. In this algorithm the parameter pepper is not used because strings $H_K$ are not locally verified; instead the multiple authenticators can be "hardened" by, for example, iterated hashing or use of a key derivation function. This embodiment is a general technique for remote password authentication, which allows the user to enter more than one answer, and allows for the production of multiple authenticators. This may be combined with any auditing mechanisms or password lockout techniques that are currently in use. In essence, this approach can be considered "authenticating by answer subset derived passwords. " This type of remote authentication is useful even when there is no digital secret to be protected, but instead only the access to some resource or service on the remote server is being protected with answer subset derived passwords.

During the encryption phase, at the server, the encryption algorithm can optionally hash commitment strings $G_K$ an additional time, erase $G_K$, and then store at the server the result $h(G_K)$. Then, during the decryption phase, the algorithm hashes test strings $H_K$, and compares the result $h(H_K)$ to $h(G_K)$. This technique has the advantage that an insider attacker who compromises the database will not be able to use the captured data to later impersonate the user. Alternatively, any one-way transformation on $G_K$ can be used. For example iterated hashing or use of a key derivation function are acceptable ways of transforming the test strings $T_K$ The security of the digital secret D encrypted in a vault can potentially be enhanced by using the server to assist in protecting the secret. In this case, the remote server stores the vault, and authenticates the user with answer subset derived passwords as described above. During the decryption phase, the user is not automatically allowed to download the vault to his computer (e. g., client). Instead, the user must first authenticate by means of answer subset derived passwords, e. g., by answering questions and then sending $H_K$ to the server. At the server, the algorithm determines whether any $H_K$ match stored $G_K$. Only if it finds a match will the algorithm allow the server to send the vault to the user's computer. Then the algorithm uses the answers that the user has already provided and the answers within at least one subset can be presumed to be correct, and which are cached in the user's computer so they do not have to be retyped, to decrypt the digital secret D. This modification has the advantage that an attacker cannot download any user's vault and attempt to decrypt that user's secret by means of an offline dictionary attack.

The security of the digital secret D encrypted in a vault can potentially be enhanced in a different manner by using the server to assist in protecting the secret. The remote server stores the vault and authenticates the user with answer subset derived passwords as described above. In this case, after the user authenticates, e. g., after the algorithm finds a match between $H_K$ and $G_K$ at the server, the server does not send the entire vault to the user's computer. Instead, the algorithm identifies the subset K with which the user has correctly authenticated, and sends the single value $F_K$ to the user's computer along with the subset identifier K, rather than sending the entire vault, which consists of all $F_K$ and $G_K$. When the user's computer receives $F_K$, the algorithm uses answers corresponding to subset K to decrypt digital secret D out of $F_K$. Because the server has already identified the subset K of correct answers by authenticating the user with $H_K$, it will take only a single decryption attempt to obtain D. This has the advantage of saving computational effort at the user's computer, as well as communications bandwidth.

Although, in the described embodiments, a hash function is used to commit to the answer strings and/or the digital secret, in general any function can be used that commits to the information that should be hidden. The function will have the features of hiding the information so that it is computationally difficult to extract the information from the output of the function and computationally binds the result with the input.

Hardware Implementation of the Algorithm

Figure 8:
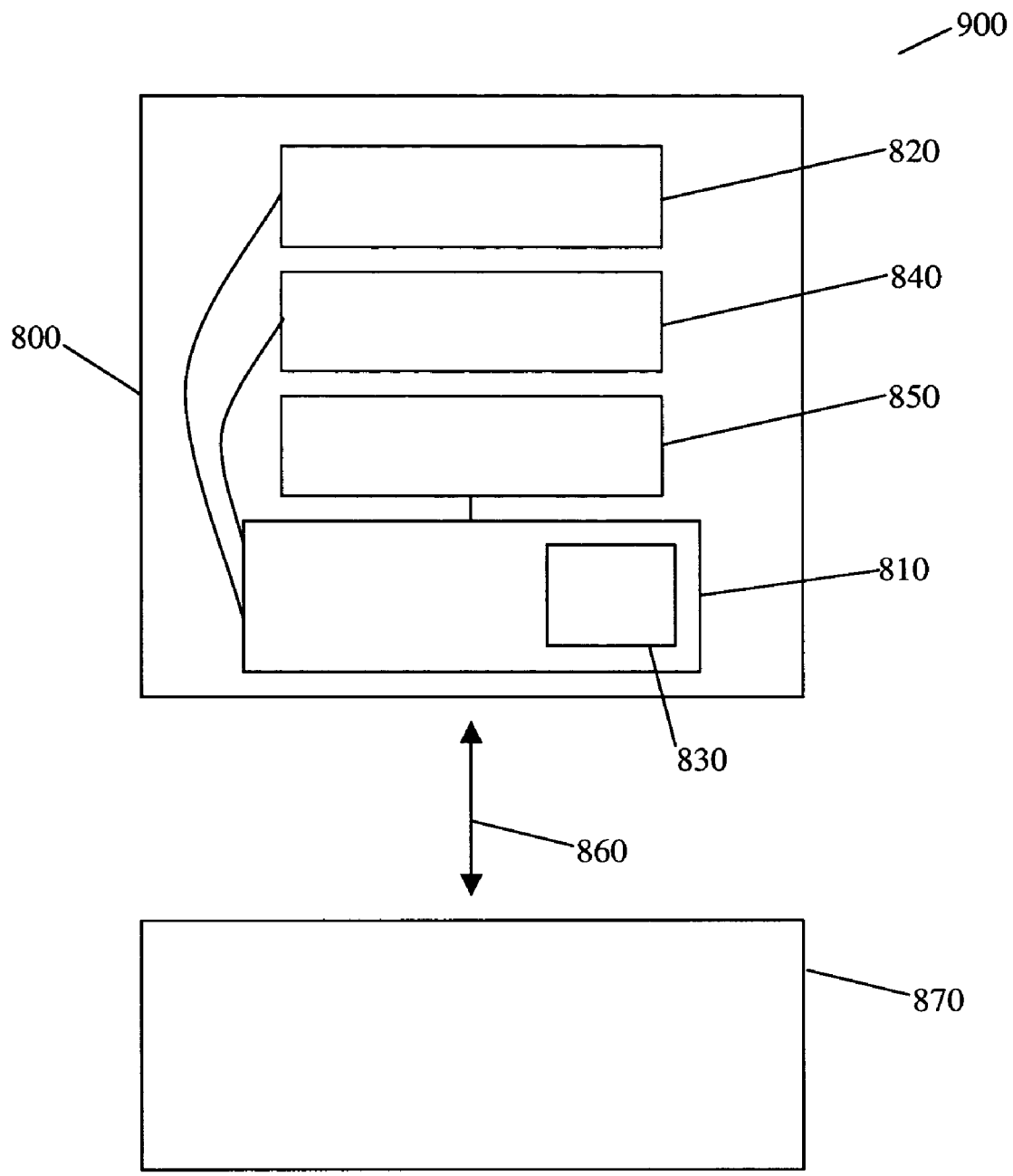
FIG. 8 shows a system on which the data encryption and decryption functionality is implemented.

The algorithm can be implemented for example, on the system illustrated in FIG. 8. System 900 includes user computer 800 that can be, for example, a PC, and optionally includes remote server 870. Computer 800 includes microprocessor 810, which includes on-board memory 830. Computer 800 also includes display device 820, input device 840, and storage medium 850, all of which are operably connected to and controlled by microprocessor 810.

Microprocessor 810 executes the steps of the algorithm, the code for which resides in memory 830. At appropriate steps in the algorithm, display device 820 displays questions to the user. The user responds by entering answers into input device 840, which can be, for example, a keyboard or other suitable device. The answers can be displayed in clear form on display device 820 as the user enters them, or they can be hidden so that an observer would not be able to read the answers.

If the algorithm is in the encryption phase, then the answers are assumed to be correct, and microprocessor 810 constructs the vault using those answers and the encryption steps described herein. Microprocessor 810 stores the vault on storage medium 850. If the algorithm is in the decryption phase, then the answers are not assumed to be correct. Microprocessor 810 recalls the vault from storage medium 850, and proceeds to attempt to decrypt the secret using the candidate answers and the decryption steps described herein. If a sufficient subset of candidate answers are correct, then microprocessor 810 successfully decrypts the digital secret D and provides it to the user. Optional remote server 870 communicates with computer 800 via network 860. Server 870 may have similar components and functionality to computer 800. For example, server 870 can include a storage medium to store questions and/or the vault, and a microprocessor on which the algorithm runs. Network 860 can be any kind of network over which computers can communicate, for example, the Internet.

Other embodiments are within the following claims.

What is claimed is:

1. A method for storing secret information in a digital vault on a storage medium, said method comprising:

obtaining from a user, via an input device, an answer to each of m different questions to generate a set of m answers, wherein m is an integer greater than or equal to 3;

identifying, via a microprocessor, subsets $S_K$ of the m questions for which acceptable answers later provided by an entity will enable that entity to gain access to the secret information in the digital vault, wherein each subset $S_K$ includes a set of $n_K$ questions, wherein K is an integer identifying the subset and each $n_K$ is an integer that is less than m, wherein at least one subset $S_K$ has at least two elements; and for each subset of questions, $S_K$:
(a) generating, via the microprocessor, a string $T_K$ from the obtained answers for that subset of questions $S_K$;
(b) mathematically combining, via the microprocessor, a value derived from the string, $T_K$, with the secret information to generate a result, $F_K$, that hides the secret information; and
(c) storing $F_K$, in the digital vault on the storage medium, wherein the digital vault comprises all stored $F_K$;

wherein the string $T_K$ is a concatenation consisting of the following elements in this listed order:
K;
immediately followed by a delimiter;
immediately followed by a salt value;
immediately followed by the delimiter;
immediately followed by a pepper value;
immediately followed by the delimiter; and
immediately followed by, for each answer in $S_K$:
  a length of that answer;
  immediately followed by the delimiter;
  immediately followed by that answer; and
  immediately followed by:
    if that answer is a last answer in $S_K$, no further characters;
    otherwise, the delimiter;
wherein the salt value is a value particular to the user that is stored and retrieved without using encryption or decryption processes;
wherein the pepper value is a randomly generated value.

2. The method of claim 1, wherein acceptable answers correspond to answers to the subset of questions obtained from the user.

3. The method of claim 1, wherein acceptable answers are derived from answers obtained from the user.

4. The method of claim 1, wherein the digital vault is stored on a remote server.

5. The method of claim 1, wherein the m different questions are stored on a remote server and downloaded to a user computer.

6. The method of claim 1, further comprising generating a result that allows the verification of later decryption of the secret information.

7. The method of claim 1, wherein (b) comprises mathematically transforming the string, $T_K$, to generate a value, $F_K'$, and mathematically combining that value, $F_K'$, with the secret information to generate a result, $F_K$, that hides the secret information.

8. The method of claim 7, wherein mathematically transforming the string $T_K$ comprises hashing $T_K$.

9. The method of claim 7, wherein mathematically transforming the string $T_K$ includes the application of a key derivation function.

10. The method of claim 7, wherein mathematically combining the value, $F_K'$, with the secret information comprises using an exclusive-or function.

11. The method of claim 7, wherein mathematically combining the value, $F_K'$, with the secret information comprises using an encryption function.

12. The method of claim 1, further comprising, for each subset of questions, $S_K$:
(d) mathematically transforming the string, $T_K$, to generate a commitment value, $G_K$; and
(e) storing $G_K$ with $F_K$;
wherein the digital vault comprises all stored $F_K$ and $G_K$.

13. The method of claim 10, wherein the digital vault is stored on a remote server.

14. The method of claim 1, wherein mathematically combining a value derived from the string $T_K$, and the secret information comprises using an exclusive-or function.

15. The method of claim 1, wherein mathematically combining a value derived from the string $T_K$, and the secret information comprises using an encryption function.

16. The method of claim 15, wherein the encryption function comprises integrity protection.

17. The method of claim 1, further comprising:
(d) generating a confirmation string Z from the secret information which allows the verification of later decryption of the secret information; and
(e) storing Z with $F_K$; wherein the digital vault comprises Z and all stored $F_K$.

18. The method of claim 1, wherein the string $T_K$ comprises a concatenation of the obtained answers.

19. The method of claim 18, wherein the string $T_K$ further comprises a random number.

20. The method of claim 18, wherein the string $T_K$ further comprises a number specific to the vault.

21. The method of claim 1, wherein the digital vault further comprises a description of subsets $S_K$.

22. The method of claim 1, further comprising erasing the obtained answers and the secret information after storing $F_K$.

23. The method of claim 1, further comprising erasing the intermediate values used in the computation of the vault.

24. The method of claim 1, wherein the subsets $S_K$ comprise all possible subsets of n questions, where n is an integer less than m.

25. A method of gaining access to secret information contained within a digital vault on a storage medium, said method comprising:
obtaining, via an input device, from a user an answer to each of m different questions to generate a set of m answers, wherein m is an integer greater than or equal to 3;
identifying, via a microprocessor, subsets $S_K$ of the m questions for which acceptable answers provided by an entity will enable that entity to gain access to the secret information in the digital vault, wherein each subset $S_K$ includes a set of $n_K$ questions, wherein K is an integer identifying the subset and each $n_K$ is an integer that is less than m, wherein at least one subset $S_K$ has at least two elements;
selecting, via the microprocessor, a first subset from among the subsets $S_K$ of questions and for the selected subset:
(a) generating, via the microprocessor, a string $V_K$ from the obtained answers for that subset of questions $S_K$;
(b) comparing, via the microprocessor, a value derived from the string, $V_K$ to a set of stored values to find a match;
(c) if a match is found, giving the user access to the secret information in the digital vault on the storage medium,
repeating (a) through (c) for a next selected subset among the subsets $S_K$ until all subsets $S_K$ have been selected or until a match is found;
wherein the string $V_K$ is a concatenation consisting of the following elements in this listed order:
K;
immediately followed by a delimiter;
immediately followed by a salt value;
immediately followed by the delimiter;
immediately followed by a pepper value;
immediately followed by the delimiter; and
immediately followed by, for each answer in $V_K$:
  a length of that answer;
  immediately followed by the delimiter;
  immediately followed by that answer; and immediately followed by:
   if that answer is a last answer in $V_K$, no further characters;
   otherwise, the delimiter;
wherein the salt value is a value particular to the user that is stored and retrieved without using encryption or decryption processes;
wherein the pepper value is a randomly generated value.

26. The method of claim 25, wherein acceptable answers correspond to answers to the subset of questions obtained from the user.

27. The method of claim 25, wherein acceptable answers are derived from answers obtained from the user.

28. The method of claim 25, wherein giving the user access to the secret information comprises using a value derived from the string $V_K$ as a decryption key for the secret information contained within the digital vault.

29. The method of claim 25, wherein giving the user access to the secret information comprises using a value derived from the string $V_K$ with an exclusive-or function on the secret information contained within the digital vault.

30. The method of claim 25, wherein (b) comprises mathematically transforming the string, $V_K$, to generate a value $H_K$; and comparing a value derived from the value, $H_K$, to a set of stored values to find a match.

31. The method of claim 30, wherein mathematically transforming the string $V_K$ comprises using a one-way hash function.

32. The method of claim 25, further comprising allowing the user to attempt to access at least a portion of the digital information in the vault only after the user successfully authenticates.

33. The method of claim 25, wherein the m different questions are stored on a remote server and downloaded to a user computer.

34. The method of claim 25, wherein the digital vault is stored on a remote server.

35. The method of claim 34, further comprising authenticating the user to the remote server.

36. The method of claim 34, further comprising authenticating the user to the remote server by sending a value derived from the string, $V_K$, to the server, and comparing a value derived from the string, $V_K$, to a set of values stored at the server; to find a match; and, if a match is found, sending the user at least a portion of the vault.

37. The method of claim 25, wherein identifying subsets $S_K$ of the m questions comprises obtaining identifying information from the digital vault.

38. A method of gaining access to secret information contained within a digital vault on a storage medium, said method comprising:
   obtaining, via an input device, from a user an answer to each of m different questions to generate a set of m answers, wherein m is an integer greater than or equal to 3;
   identifying, via a microprocessor, subsets $S_K$ of the m questions for which acceptable answers provided by an entity will enable that entity to gain access to the secret information in the digital vault, wherein each subset $S_K$ includes a set of $n_K$ questions, wherein K is an integer identifying the subset and each $n_K$ is an integer that is less than m, wherein at least one subset $S_K$ has at least two elements;
   selecting, via the microprocessor, a first subset from among the subsets $S_K$ of questions and for the selected subset:
   (a) generating, via the microprocessor, a string $V_K$ from the obtained answers for that subset of questions $S_K$;
   (b) using a value, via the microprocessor, derived from the string, $V_K$, to attempt to access the secret information; and
   (c) verifying, via the microprocessor, whether the attempt was successful; and unless the attempt was successful, repeating (a) through (c) for a next selected subset among the subsets $S_K$ until all subsets $S_K$ have been selected; and
   if the attempt is successful, giving the user access to the secret information in the digital vault on the storage medium;
   wherein the string $V_K$ is a concatenation consisting of the following elements in this listed order:
   K;
   immediately followed by a delimiter;
   immediately followed by a salt value;
   immediately followed by the delimiter;
   immediately followed by a pepper value;
   immediately followed by the delimiter; and
   immediately followed by, for each answer in $V_K$:
      a length of that answer;
      immediately followed by the delimiter;
      immediately followed by that answer; and
      immediately followed by:
         if that answer is a last answer in $V_K$, no further characters;
         otherwise, the delimiter;
   wherein the salt value is a value particular to the user that is stored and retrieved without using encryption or decryption processes;
   wherein the pepper value is a randomly generated value.

39. A method of registering authentication material on a storage medium, said method comprising:
   obtaining, via an input device, from a user an answer to each of m different questions to generate a set of m answers, wherein m is an integer greater than or equal to 3;
   identifying, via a microprocessor, subsets $S_K$ of the m questions for which acceptable answers later provided by an entity will enable that entity to authenticate, wherein each subset $S_K$ includes a set of $n_K$ questions, wherein K is an integer identifying the subset and each $n_K$ is an integer that is less than m, wherein at least one subset $S_K$ has at least two elements; and
   for each subset of questions, $S_K$:
   (a) generating, via the microprocessor, a string $T_K$ from the obtained answers for that subset of questions $S_K$;
   (b) mathematically transforming, via the microprocessor, the string, $T_K$, to generate a value $G_K$;
   (c) storing in the digital vault on the storage medium $G_K$, wherein the authentication material comprises all stored $G_K$;
   wherein the string $T_K$ is a concatenation consisting of the following elements in this listed order:
   K;
   immediately followed by a delimiter;
   immediately followed by a salt value;
   immediately followed by the delimiter;
   immediately followed by a pepper value;
   immediately followed by the delimiter; and
   immediately followed by, for each answer in $S_K$:
      a length of that answer;
      immediately followed by the delimiter;
      immediately followed by that answer; and
      immediately followed by:
         if that answer is a last answer in $S_K$, no further characters;
         otherwise, the delimiter;

wherein the salt value is a value particular to the user that is stored and retrieved without using encryption or decryption processes;

wherein the pepper value is a randomly generated value.

40. A method of authenticating a user, said method comprising:

obtaining, via an input device, from a user an answer to each of m different questions to generate a set of m answers, wherein m is an integer greater than or equal to 3;

identifying, via a microprocessor, subsets $S_K$ of the m questions for which acceptable answers later provided by an entity will enable that entity to authenticate, wherein each subset $S_K$ includes a set of $n_K$ questions, wherein K is an integer identifying the subset and each $n_K$ is an integer that is less than m, wherein at least one subset $S_K$ has at least two elements; and for each subset of questions, $S_K$:

(a) generating, via the microprocessor, a string $V_K$ from the obtained answers for that subset of questions $S_K$;

(b) comparing, via the microprocessor, a value derived from the string $V_K$ to a set of stored values to find a match; and (c) if a match is found authenticating the user, repeating (a) through (c) for a next selected subset among the subsets $S_K$ until all subsets $S_K$ have been selected or until a match is found;

wherein the string $V_K$ is a concatenation consisting of the following elements in this listed order:

K;

immediately followed by a delimiter;

immediately followed by a salt value;

immediately followed by the delimiter;

immediately followed by a pepper value;

immediately followed by the delimiter; and immediately followed by, for each answer in $V_K$:

a length of that answer;

immediately followed by the delimiter;

immediately followed by that answer; and immediately followed by:

if that answer is a last answer in $V_K$, no further characters;

otherwise, the delimiter;

wherein the salt value is a value particular to the user that is stored and retrieved without using encryption or decryption processes;

wherein the pepper value is a randomly generated value.

41. The method of claim 1, wherein the pepper value has a number of bits that is inversely proportional to m allowing the computational effort of generating the string $T_K$ to be substantially independent of m.

42. The method of claim 25, wherein the pepper value has a number of bits that is inversely proportional to m allowing the computational effort of generating the string $V_K$ to be substantially independent of m.

43. The method of claim 38, wherein the pepper value has a number of bits that is inversely proportional to m allowing the computational effort of generating the string $V_K$ to be substantially independent of m.

44. The method of claim 39, wherein the pepper value has a number of bits that is inversely proportional to m allowing the computational effort of generating the string $T_K$ to be substantially independent of m.

45. The method of claim 40, wherein the pepper value has a number of bits that is inversely proportional to m allowing the computational effort of generating the string $V_K$ to be substantially independent of m.

46. The method of claim 12:

wherein mathematically combining the value derived from the string, $T_K$, with the secret information to generate the result, $F_K$, includes using a reversible function allowing calculation of the string, $T_K$, from the result, $F_K$; and wherein mathematically transforming the string, $T_K$, to generate the commitment value, $G_K$ includes using an irreversible function preventing calculation of the string, $T_K$, from the commitment value, $G_K$.

* * * * *